United States Patent
Vines

(12) 
(10) Patent No.: US 6,252,873 B1
(45) Date of Patent: Jun. 26, 2001

(54) METHOD OF ENSURING A SMOOTH TRANSITION BETWEEN MPEG-2 TRANSPORT STREAMS

(76) Inventor: Gregory O. Vines, 14400 Midland Rd., Poway, CA (US) 92064

( * ) Notice: Subject to any disclaimer, the term of this patent is extended or adjusted under 35 U.S.C. 154(b) by 0 days.

(21) Appl. No.: 09/098,794

(22) Filed: Jun. 17, 1998

(51) Int. Cl.⁷ ....................................... H04J 3/24
(52) U.S. Cl. ............................................ 370/389
(58) Field of Search ................... 370/389, 395, 370/465, 480, 501; 348/9, 6, 707, 706, 14.02, 14.11, 426.1, 427.1, 428.1, 429.1, 431.1, 441, 433, 451, 452, 454, 457, 471, 472, 473, 584, 588, 598, 599; 714/746

(56) References Cited

U.S. PATENT DOCUMENTS 5,534,944   7/1996   Egawa .
5,892,535 * 4/1999   Allen et al. ............................. 348/9
5,978,855 * 11/1999  Metz et al. ........................... 709/240

* cited by examiner

*Primary Examiner*—Dang Ton

(57) ABSTRACT

A method to eliminate objectionable artifacts that occur at the transition between two independently created MPEG-2 transport streams is provided herein. The method processes all of the elementary streams in one program of a transport stream to eliminate partial or missing information at the transitions. The length of the transport stream is altered so that its presentation duration is exactly equal to its transmission duration. A fixed delay is used between the beginning of transmission and the beginning of presentation. The same delay is used between the end of transmission and the end of presentation. The transport stream transmission duration is set by adjusting the number of transport packets and altering the system clock frequency.

16 Claims, 10 Drawing Sheets

METHOD OF ENSURING A SMOOTH TRANSITION BETWEEN MPEG-2 TRANSPORT STREAMS

BACKGROUND

1. Field of Invention

This invention relates to the processing and transfer of data according to the standard adopted by the Moving Picture Experts Group (MPEG), specifically, to a method of processing an MPEG-2 transport stream to ensure a smooth transition with a similarly processed transport stream.

2. Description of Prior Art

The MPEG-2 standard consists of the International Standards Organization (ISO) standards 13818-1 Systems, 13818-2 Video and 13818-3 Audio, which are hereby incorporated by reference.

MPEG-2 is most commonly used in television systems. Applications of MPEG-2 exist both in broadcast environments and in storage environments. In a broadcast environment, content is encoded on a continuous basis and all changes in source material must be made prior to the encoding process. In a storage environment, content is encoded and stored. A video file server may transmit the stored, precompressed streams at a later time.

The transport stream output from an MPEG-2 storage encoder typically consists of a single program of a defined length which was encoded according to a set of user specified configuration parameters. Because the encoder was designed to create content in an isolated environment for storage purposes, it is likely that the implications of decoding in a broadcast system were not fully considered. For example, while it may be possible to create a stream with an exact number of frames, there may still be a timing discontinuity if two such streams are played consecutively on a decoder. This discontinuity would be visible as a roll or tear on the monitor.

Use of a broadcast encoder to generate transport stream segments is also problematic. In this case, the control system may not easily permit setting encoding parameters with fine temporal granularity. For example, it may not be possible to specify that a particular frame should be encoded as an I-Picture, or it may be difficult to coordinate the encoder and storage equipment to capture a stream that is exactly the program duration.

In Video on Demand (VOD) or Near Video on Demand (NVOD) applications, a video server transmits pre-compressed programs at scheduled times. It is highly desirable for the consumer to view the decoded stream as a continuous experience without objectionable artifacts or transitions. This goal is a challenge because each program may be encoded and stored individually, possibly from different encoders.

Although the video server may be able to stream back-to-back programs from two files without interruption, errors may still be perceived at the transition depending upon how the stored transport streams begin and end. Because transport streams are coded hierarchically, discontinuities may occur at multiple layers in the stream. The resulting artifacts vary in severity, depending upon the nature of the discontinuity. At a worst case, a full reacquisition of the transport stream will occur when both audio and video decoders lose synchronization at the transition. The reconstructed video may exhibit a roll or tear when the monitor resynchronizes due to a discontinuity in the frame timing. There may also be a chrominance loss or shift if there is a time base discontinuity. The displayed video may exhibit blocky artifacts that persist for several frames if predictive frames reference an incorrect anchor frame or if an incomplete picture is sent at the transition. Audio may dropout, pop, or hiss if incomplete sync frames are decoded.

In an article by S. Marrill Weiss in the *SMPTE Journal*, December 1995, titled "Switching Facilities in MPEG-2: Necessary But Not Sufficient", the problems associated with concatenating separately compressed MPEG-2 streams are discussed. Several extensions to MPEG-2 are proposed. The author does not claim that these extensions will answer all needs or that they will completely solve any of the problems. Rather they are put forth to provide a basis for further developments. The approach is based on imposing constraints on how the transport stream is generated. The extensions proceed by first restricting the transport rate so that each video access unit period is an integral number of transport packets. The transport stream duration is restricted to one of a number of standardized lengths. An additional constraint limits the GOP, or I frame refresh, rate to a fixed number of frames. Specific transition points are also defined in the transport stream, and the encoder must fill the buffer for all elementary streams to a defined level at the transition points. There are several problems with this approach. For example, the requirement of meeting a specific buffer fullness may adversely affect the quality of the video since the optimal bit allocation between pictures will have to be changed. Additionally, constraining the transport rate will not be possible for many applications, such as satellite transmission, where the transport rate is a function of the channel.

U.S. Pat. No. 5,534,944 to Egawa et al. (1996) proposes a solution to the splicing of video streams wherein stuffing bits are used at the splicing point to position the decoder's buffer at the appropriate level for the new video stream. While this approach will avoid buffer problems, it does not address several problems associated with transitions between previously encoded transport streams. For example, the presence of non-video elementary streams, splicing in the middle of a video stream where there may be odd fields or missing anchor frames, allowing streams to be spliced together in any order, and the timing problems associated with the transport layer are not addressed.

OBJECTS AND ADVANTAGES

A method for processing existing transport streams or creating transport streams for seamless concatenation will enable a smooth transition between individually encoded programs which are joined together either off-line or in real-time. If all coding layers in each transport stream start and end according to well-defined rules, two such streams may be concatenated and then decoded without exhibiting any objectionable artifacts at their junction. The viewer would see a smooth, natural transition between the two programs.

The present invention provides a method that can be used in either an off-line environment processing stored transport streams for seamless concatenation, or in a multiplexer in the creation of transport streams. The beginning and end of the transport stream are processed so as to smooth discontinuities at all layers. The resulting transport stream can be concatenated with other transport streams that have been similarly processed.

The present invention does not impose restrictions on the transport rate of the transport streams being processed. It enables two transport streams to be cleanly concatenated even when they are transmitted at different rates. In addition, no restrictions are imposed on transport stream length, I frame refresh rates, and buffer levels. Instead of constraining the encoder, the present invention adjusts the transport stream to achieve the exact duration necessary for seamless transitions.

Further objects and advantages will become apparent from a consideration of the ensuing drawings and detailed description.

DRAWING FIGURES

In the drawings, closely related figures have the same number but different alphabetic suffixes.

SUMMARY

Figure 1A:
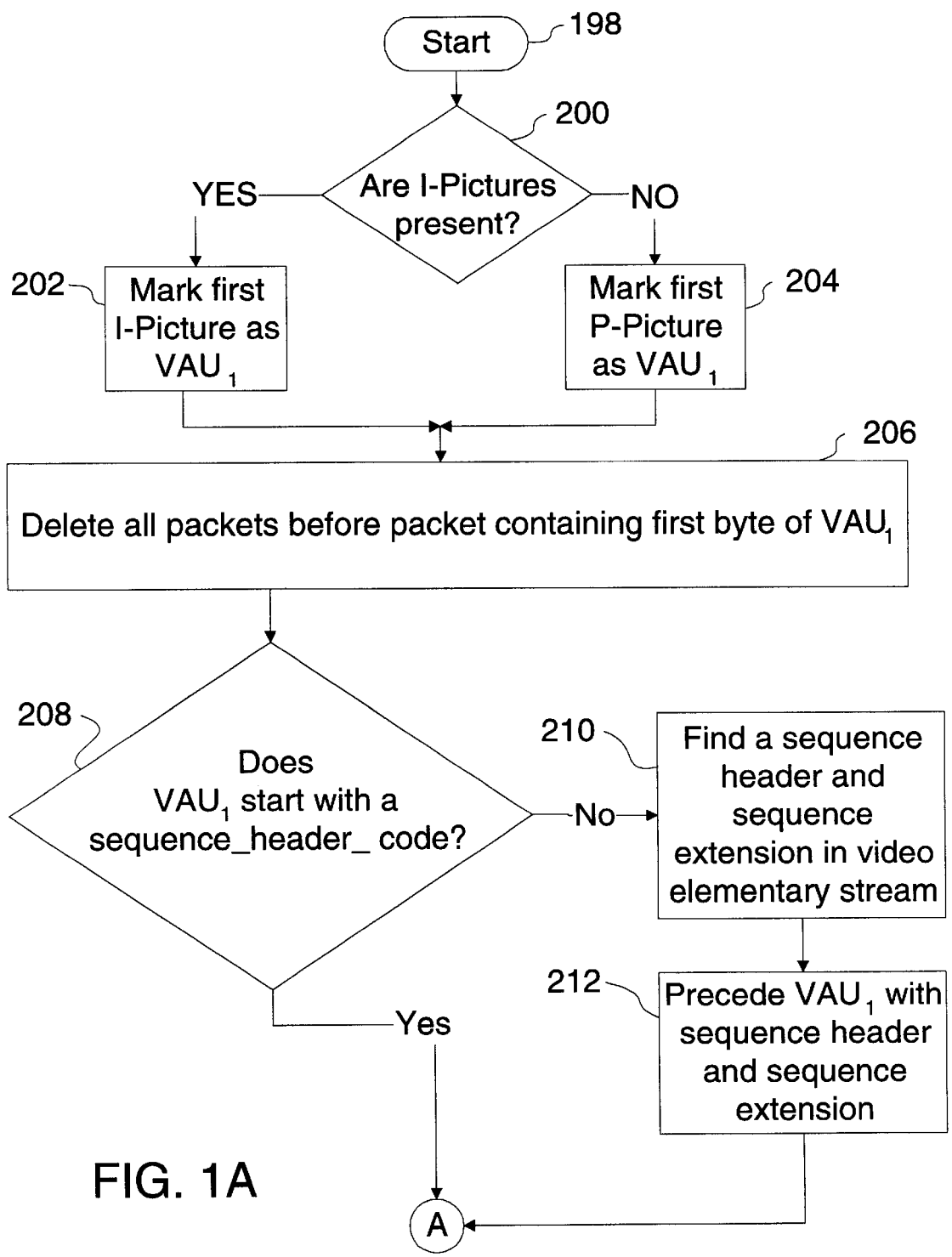
FIGS. 1A to 1G are flowchart diagrams of an exemplary routine for setting the transmission duration and system clock frequency of an MPEG-2 transport stream, and processing the beginning of the stream to indicate the presence of a transition.
Figure 1B:
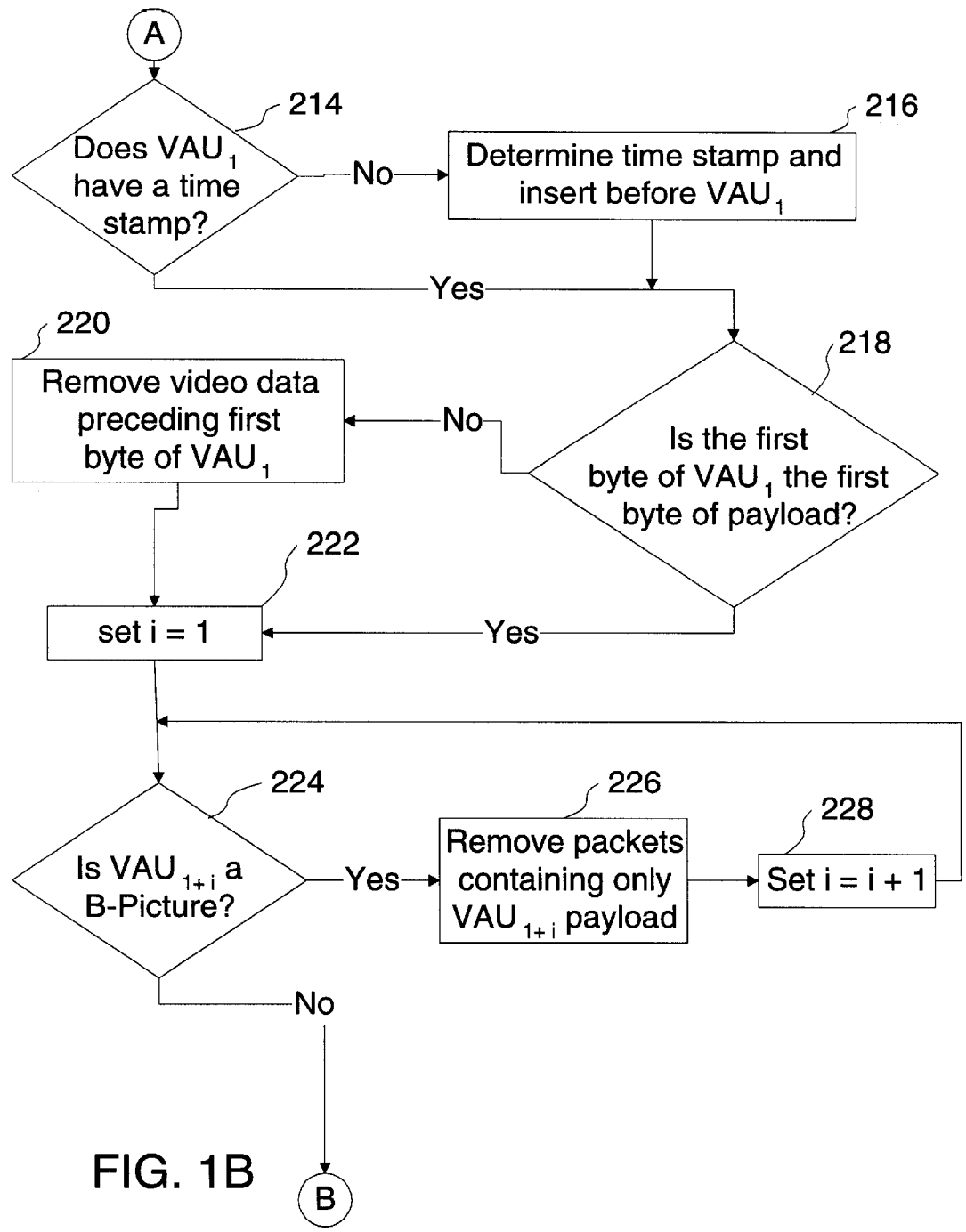
Figure 1C:
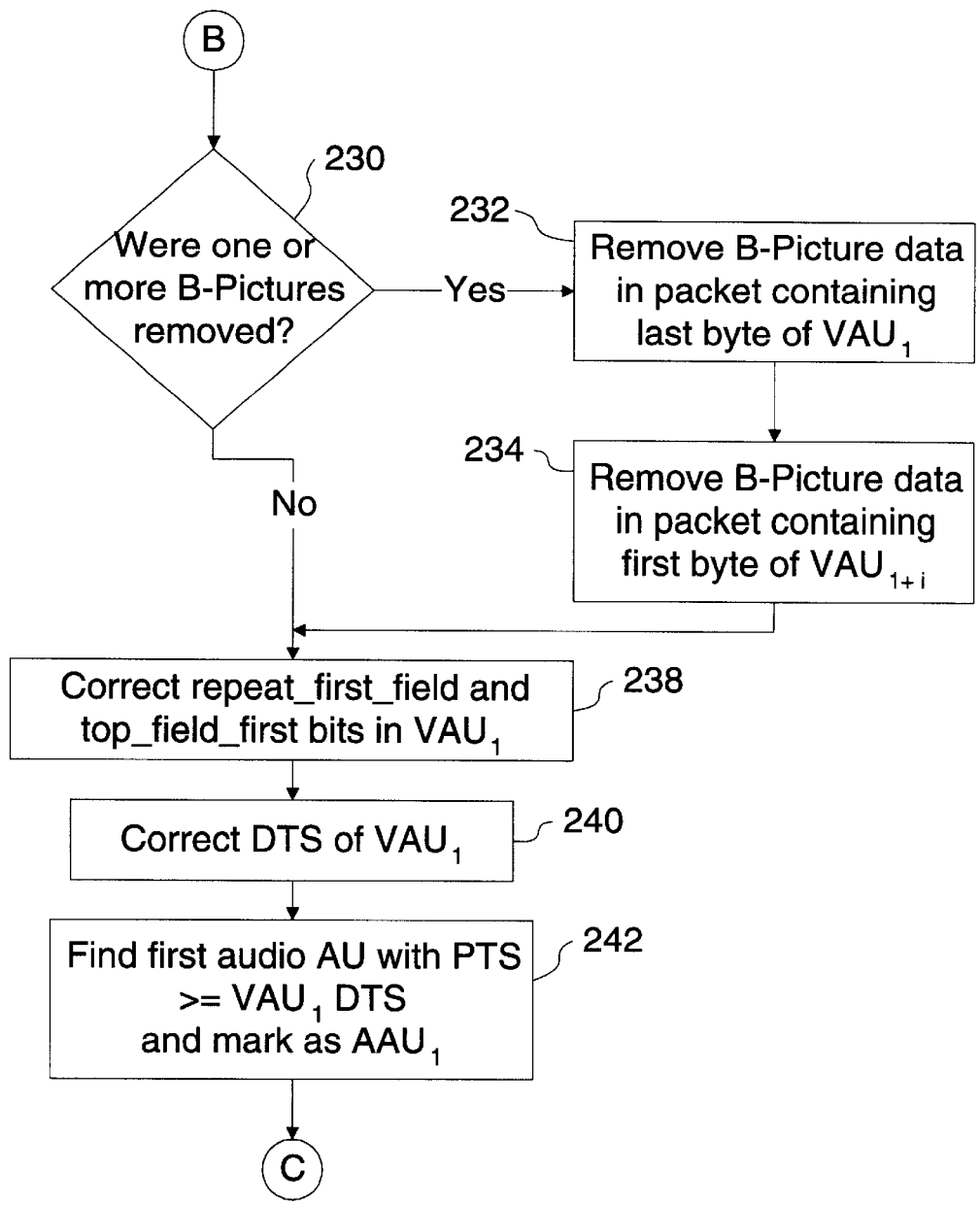
Figure 1D:
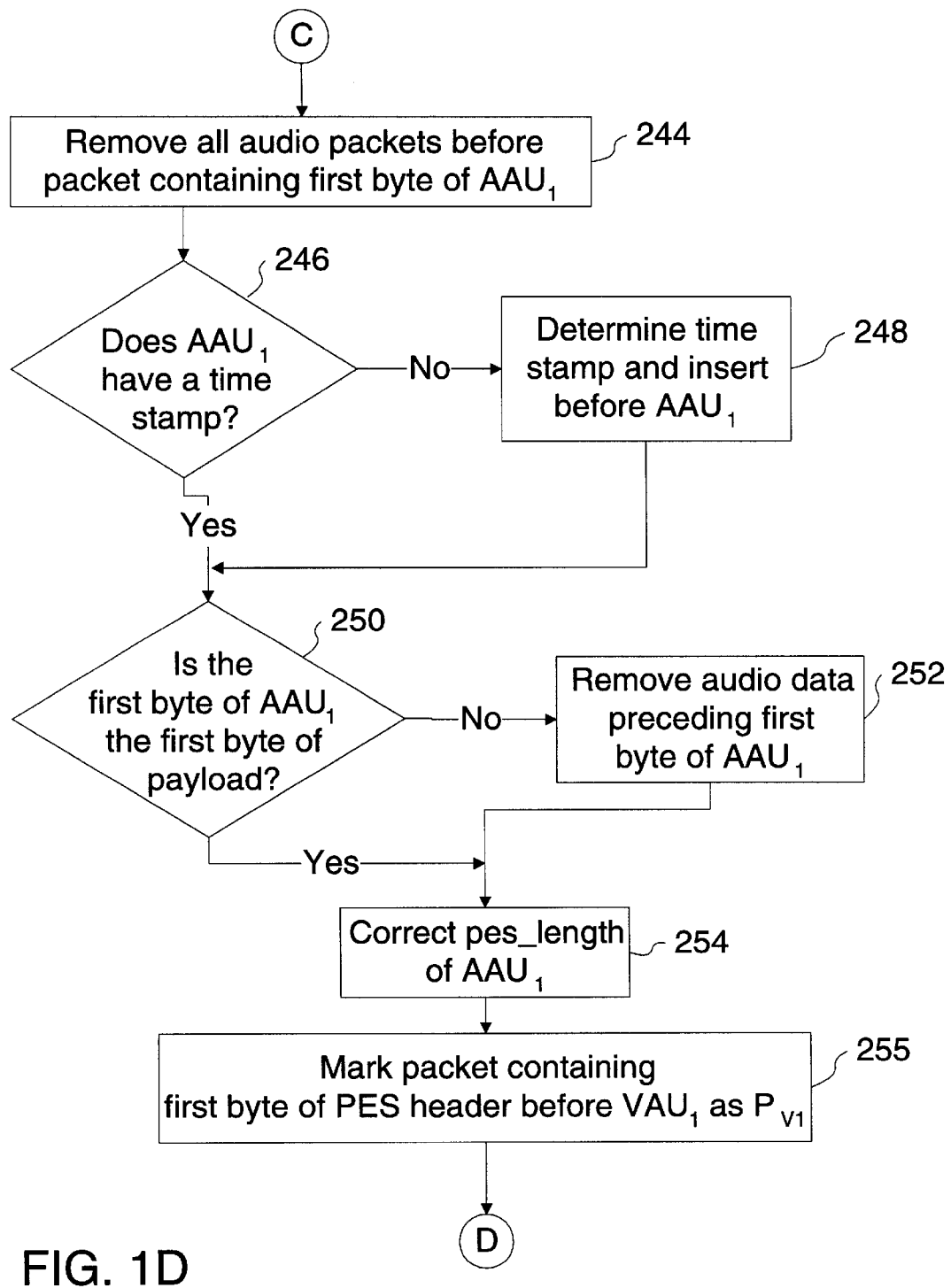
Figure 1E:
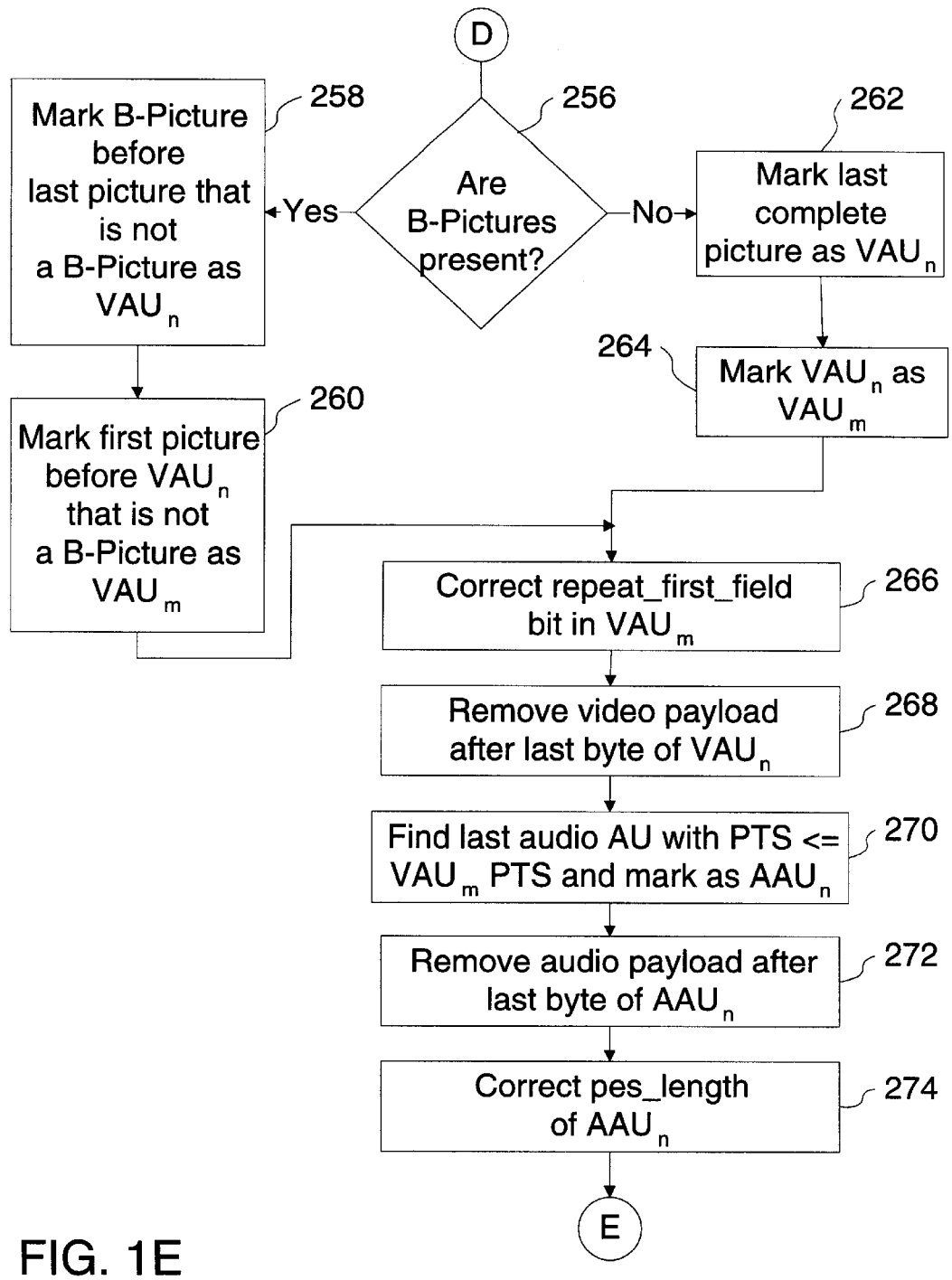
Figure 1F:
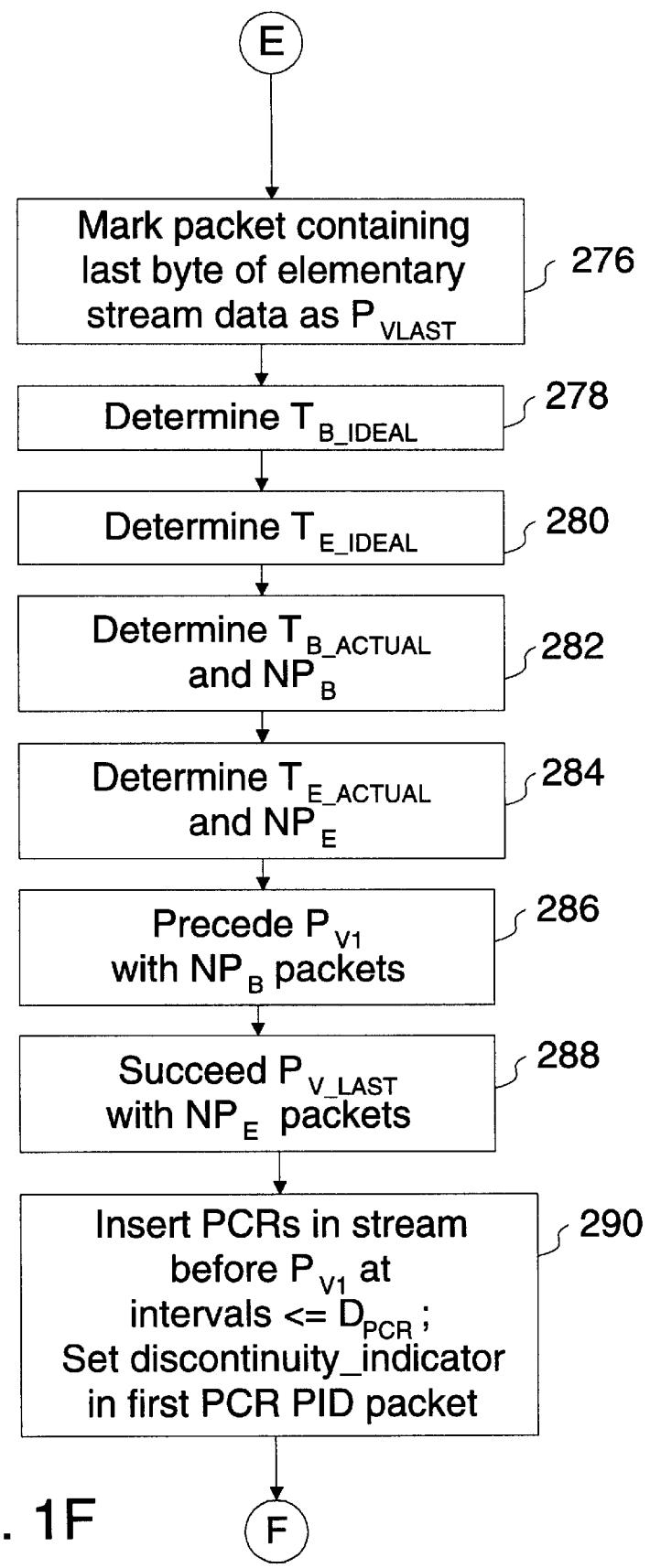
Figure 1G:
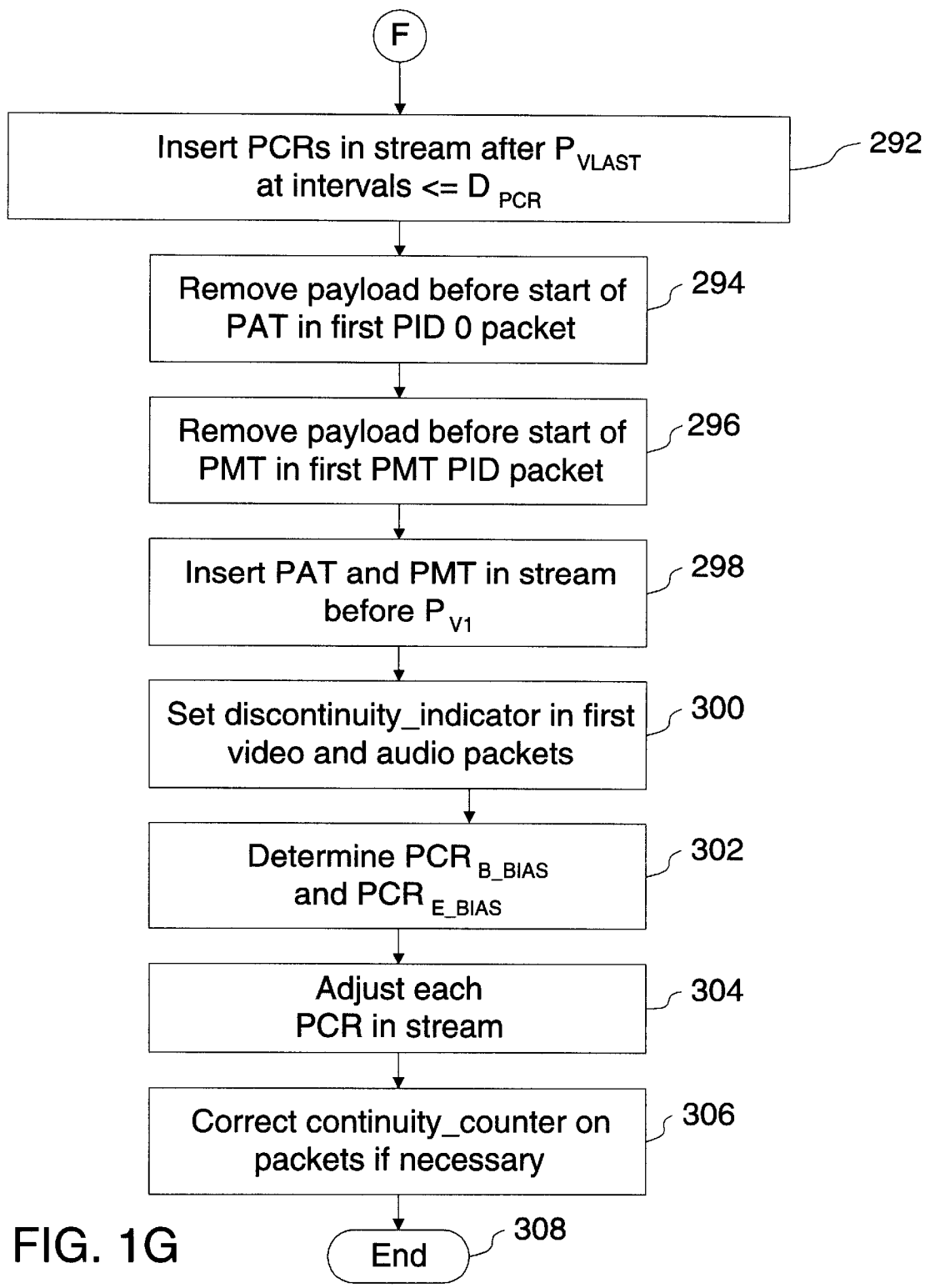

The present invention is a method of ensuring the elimination of objectionable artifacts at the transition between similarly processed MPEG-2 transport streams. According to the present invention, the transport stream duration and system clock frequency are set to match the presentation duration of the primary elementary stream in a transport stream.

DESCRIPTION

FIGS. 1A to 1G are flowchart diagrams of an exemplary routine for setting the transmission duration and system clock frequency of an MPEG-2 transport stream, and processing the beginning of the stream to indicate the presence of a transition. The transport stream contains a single program that contains video and audio elementary streams. The video and audio elementary streams consist of access units. The video elementary stream is considered to be the primary elementary stream. The audio elementary stream is considered to be the secondary elementary stream. The program has an independent time base that is conveyed as the Program Clock Reference (PCR). The frequency of the time base is the system clock frequency. Both video and audio elementary streams reference this time base. The identities of the video and audio elementary streams are defined by descriptive information contained in the transport stream. This descriptive information consists of two Program Specific Information (PSI) tables, the Program Association Table (PAT) and the Program Map Table (PMT). The transport stream is constructed according to the syntax, semantics, and requirements for an MPEG-2 transport stream as defined in ISO/IEC 13818-1, which is hereby incorporated by reference.

The process begins at a block 198. At a decision block 200, it is determined whether there are I-Pictures in the video elementary stream. If I-Pictures are present, at a block 202 the first I-Picture found is designated as access unit $VAU_1$. If I-Pictures are not present, at a block 204 the first P-picture found is designated as $VAU_1$.

At a block 206, video elementary stream data preceding the packet that contains the first byte of $VAU_1$ is removed from the transport stream. To accomplish this, all transport packets from the beginning of the transport stream to the packet that contains the first byte of $VAU_1$ are deleted.

At a decision block 208, it is determined whether $VA_1$ starts with a sequence—header—code. If there is no sequence—header—code present, at a block 210 the video elementary stream is searched for a sequence header and sequence extension. At a block 212, the sequence header and sequence extension data are inserted in the video payload preceding the first byte of $VAU_1$. If insufficient payload is available in the packet before the first byte of $VAU_1$, then an earlier video packet is created to contain the first bytes of added data. After the sequence header and sequence extension are inserted, the first byte of the sequence—header—code becomes the first byte of $VAU_1$.

At a decision block 214, it is determined whether a presentation time stamp (PTS) for $VAU_1$ is present in the transport stream. If there is no PTS for $VAU_1$, at a block 216 a PTS is determined. The decode time stamp (DTS) for $VAU_1$ is also determined as defined in ISO/IEC 13818-1. A PES header containing the PTS is inserted before the first byte of $VAU_1$. If the decode time stamp (DTS) for $VAU_1$ is not equal to the PTS, then the DTS is also inserted in the PES header. If insufficient payload is available in the packet before the first byte of $VAU_1$, then a video packet is created to contain the PES header. This packet is placed before the packet containing the first byte of $VAU_1$.

At a decision block 218, it is determined whether the first byte of $VAU_1$ is the first byte of payload of a packet. If it is not the first byte of payload, at a block 220 the video data preceding the first byte of $VAU_1$ is removed. Adaptation field stuffing may be used to replace the eliminated video data. The first byte of $VAU_1$ then becomes the first byte of payload. Alternatively, the video data to be removed may be replaced with zero data bytes. Use of adaptation field stuffing is the preferred method because video data will not be introduced into the decoder buffer prior to the first byte of $VAU_1$.

At a block 222, a temporary variable i is set to one. At a decision block 224, it is determined whether $VAU_{1+i}$, the access unit following $VAU_1$, is a B-Picture. If $VAU_{1+i}$ is a B-Picture, at a block 226 transport packets containing only $VAU_{1+i}$ payload are removed from the transport stream. The payload of transport packets containing only $VAU_{1+i}$ payload may be replaced with adaptation field stuffing. Alternatively, transport packets containing only $VAU_{1+i}$ payload and no PCR may be substituted with null transport packets. In this case, transport packets containing only $VAU_{1+i}$ payload and a PCR are retained in the transport stream, but the payload in these packets is replaced with adaptation field stuffing. At a block 228, variable i is incremented by one. The routine returns to decision block 222 to determine whether the next access unit is a B-Picture.

At a decision block 230, it is determined if one or more B-Pictures were removed. At block 230, $VAU_{1+i}$ is not a B-Picture. If at least one B-Picture was removed, at a block 232 residual B-Picture data in the packet containing the last byte of $VAU_1$ is removed. At a block 234 residual B-Picture data in the packet containing the first byte of $VAU_{1+i}$ is removed. At both block 232 and block 234, adaptation field stuffing may be used to replace the residual B-Picture data. Alternatively, the residual B-Picture data may be replaced with zero data bytes. Use of adaptation field stuffing is the preferred method because the added zero data bytes will increase the level of the decoder buffer. At a block 238, the repeat_first_field and top_field—first fields in the picture coding extension of $VAU_1$ are corrected if necessary. If the top_field_first field in $VAU_1$ has a value of zero and the repeat_first_field field in $VAU_1$ has a value of zero, then the repeat_first_field field in $VAU_1$ is set to value of one. If the top_field_first field in $VAU_1$ has a value of zero and the repeat_first_field field in $VAU_1$ has a value of one, then the repeat_first_field field in $VAU_1$ is set to a value of zero. The top_field_first field in $VAU_1$ is set to a value of one in all cases.

At a block 240, the DTS associated with $VAU_1$ is corrected for any eliminated B-Pictures and for an adjusted repeat_first_field field value per ISO/IEC 13818-1.

At a block 242, the first audio access unit with PTS later than or equal to the DTS of $VAU_1$ is located in the transport stream. This access unit is designated as $AAU_1$. At a block 244, audio elementary stream data preceding the packet that contains the first byte of $AAU_1$ is removed from the transport stream. To accomplish this, transport packets containing audio data that precede this packet are substituted with null transport packets.

At a decision block 246, it is determined whether a PTS for $AAU_1$ is present in the transport stream. If there is no PTS for $AAU_1$, at a block 248 a PTS is determined per ISO/IEC 13818-1. A PES header containing the PTS is inserted before the first byte of $AAU_1$. If insufficient payload is available in the packet before the first byte of $AAU_1$, then an earlier audio packet is created to contain the PES header. This packet is substituted for a null packet that occurs in the transport stream before the packet containing the first byte of $AAU_1$.

At a decision block 250, it is determined whether the first byte of $AAU_1$ is the first byte of payload of the packet. If it is not the first byte of payload, at a block 252 the audio data preceding the first byte of $AAU_1$ is removed. Adaptation field stuffing is used to replace the eliminated audio data.

At a block 254, the pes—length in the PES header preceding $AAU_1$ is corrected to compensate for the eliminated audio data.

At a block 255, the packet containing the first byte of the PES header that precedes $VAU_1$ is designated as $P_{v1}$.

The routine next processes the ends of the video and audio elementary streams. At decision block 256, it is determined whether B-Pictures are present in the video elementary stream. If B-Pictures are present, at a block 258 the B-Picture preceding the last picture that is not a B-Picture is found. This B-Picture is designated as access unit $VAU_n$. At a block 260, the first picture before $VAU_n$ that is not a B-Picture is designated as $VAU_m$. In presentation order, $VAU_m$ will be last picture presented in the transport stream. If B-Pictures are not present, at a block 262 the last complete picture in the video elementary stream is designated as $VAU_n$. At block 264, $VAU_n$ is also designated as $VAU_m$.

At a block 266, the repeat_first_field field in the picture coding extension of $VAU_m$ is corrected if necessary. If the top_field_first and the repeat_first_field fields in $VAU_m$ both have the value of one, then the repeat—first—field field in $VAU_m$ is changed to a value of zero. If the top_field_first and the repeat_first_field fields in $VAU_m$ both have the value of zero, then the repeat_first_field field in $VAU_m$ is changed to a value of one. In all other cases, the repeat_first_field field in $VAU_m$ is not modified.

At a block 268, video elementary stream data following the last byte of $VAU_n$ is removed from the transport stream. The packet containing the last byte of $VAU_n$ is modified to eliminate any video data following $VAU_n$. Adaptation field stuffing may be used to replace the eliminated video data. Transport packets containing video data that follow the packet containing the last byte of $VAU_n$ are also removed. To accomplish this, all packets following the packet containing the last byte of $VAU_n$ are deleted.

At a block 270, the last audio access unit with PTS earlier than or equal to the PTS of $VAU_m$ is located in the transport stream. This access unit is designated as $AAU_n$. At a block 272, audio elementary stream data following the last byte of $AAU_n$ is removed from the transport stream. The packet containing the last byte of $AAU_n$ is modified to eliminate any audio data following $AAU_n$. Adaptation field stuffing is used to replace the eliminated audio data. Transport packets containing audio data that follow this packet are substituted with null transport packets. At a block 274, the pes_length in the PES header preceding $AAU_n$ is corrected to compensate for the eliminated audio data.

At a block 276, the packet containing the last byte of elementary stream data is located in the transport stream and is designated as $P_{Vlast}$.

The routine next adjusts the transport stream to an optimal length. This length will insure a seamless video transition when the transport stream is concatenated with another transport stream that has been processed with the same routine. All times used in the routine are relative to the system clock frequency that is carried in the transport stream by the Program Clock Reference (PCR). The input arrival time of a given byte in the transport stream is the time when the byte arrives at the decoder. The input arrival time is determined from the PCR and the transport rate as defined in ISO/IEC 13818-1. Because the transport stream is at a constant rate, the difference between the input arrival times of the first bytes of any two adjacent packets is constant. In other words, the period between adjacent packets is constant over the length of the transport stream.

Figure 2:
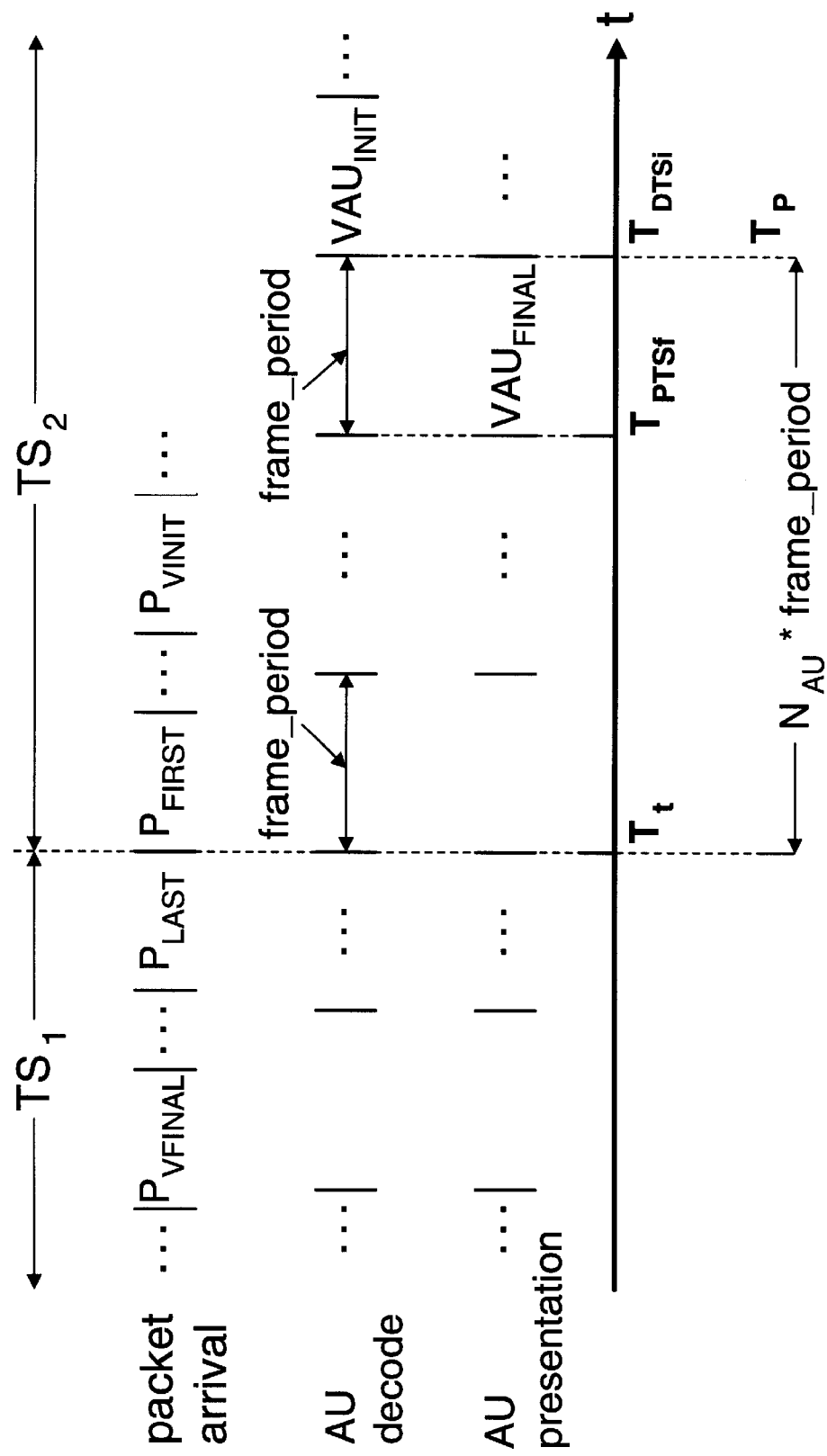
FIG. 2 is a timing diagram illustrating a boundary case of the transition between two processed transport streams.

The determination of the optimal length of the transport stream is based on the constant $N_{AU}$. $N_{AU}$ is an integer that defines a number of video frame periods. A single video frame period is the duration of one video frame displayed at the frame rate that is specified in the video elementary stream. The inventor has assigned the value 5 to $N_{AU}$, although other values may be used. FIG. 2, shows a boundary case of the transition between two processed transport streams, $TS_1$ and $TS_2$. In this case, there is no delay between the end of the presentation of video in $TS_1$ and the start of the decoding of video in $TS_2$. $P_{last}$ is the last packet in $TS_1$. $P_{first}$ is the first packet in $TS_2$. $T_1$ is the time when the transition from $TS_1$ to $TS_2$ is received. $VAU_{final}$ is the last video access unit presented in $TS_1$. $P_{Vfinal}$ is the packet containing the first byte of $VAU_{final}$. $T_{PTSf}$ is the presentation time of $VAU_{final}$. $T_{PTSf}$ plus one video frame period is the earliest time that an access unit immediately following $VAU_{final}$ could be displayed. $VAU_{init}$ is the first video access unit decoded in $TS_2$. $P_{Vinit}$ is the packet containing the first byte of $VAU_{init}$. $T_{DTSi}$ is the decode time of $VAU_{init}$. In the boundary case shown in FIG. 2, $T_{PTSf}$ plus one video frame period and $T_{DTSi}$ represent the same time, $T_p$. $T_p$ is the boundary between the end of the presentation of video in the first stream and the start of the decoding of video in the second stream. The time represented by $N_{AU}$ video frame periods is the difference between $T_1$ and $T_p$.

Figure 3A:
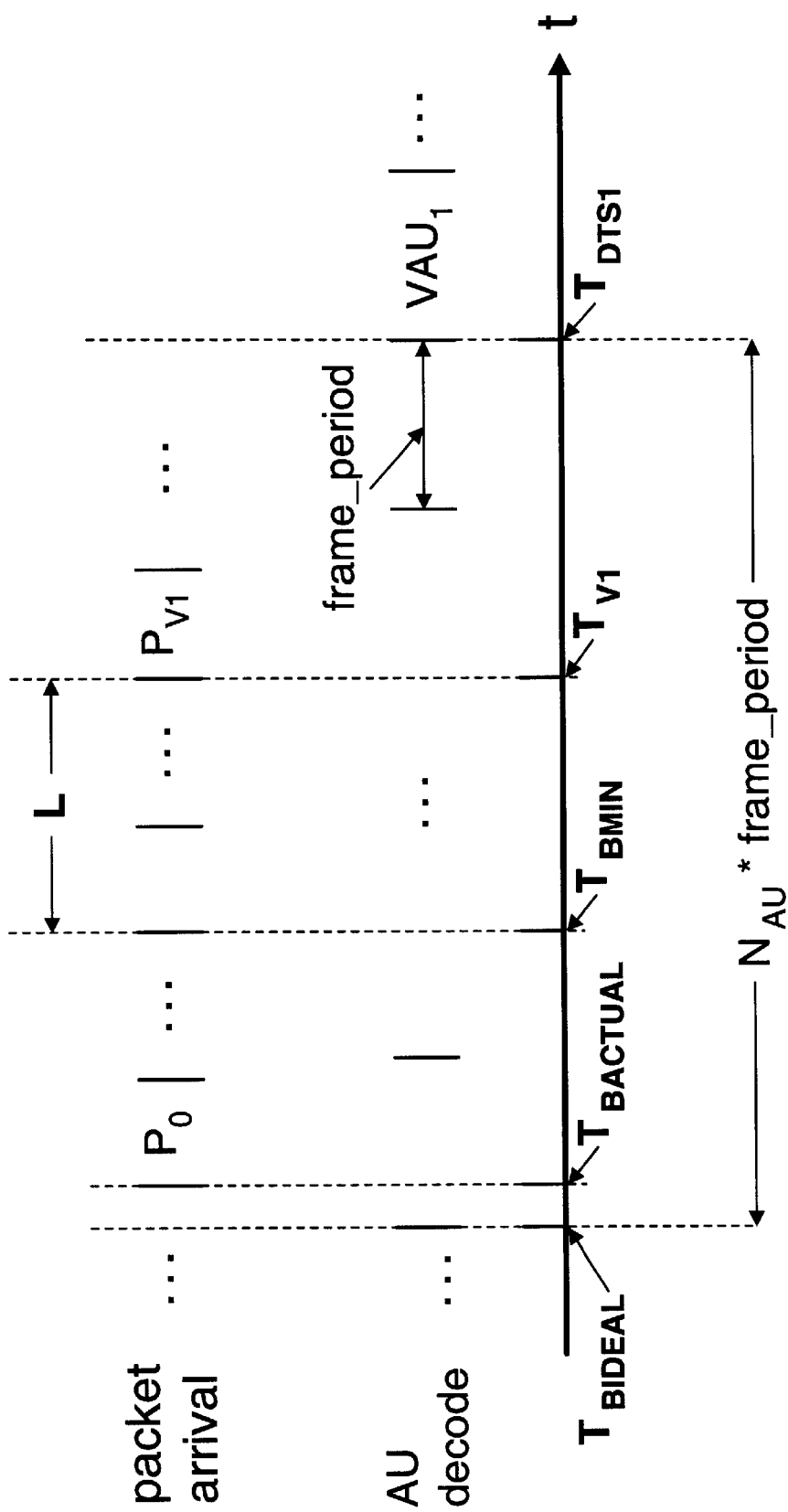
FIG. 3A is a timing diagram illustrating the determination of the length of the transport stream before the first access unit is decoded.

At a block 278, the value for $T_{Bideal}$ is determined. As shown in FIG. 3A, $T_{Bideal}$ is the ideal time for the beginning of the transport stream. $T_{Bideal}$ must be earlier than $T_{V1}$, the input arrival time of the first byte of $P_{v1}$, the packet containing the PES header for $VAU_1$. Additional time prior to $T_{v1}$ must also be included to transport Program Specific Information (PSI) tables and at least one packet containing a PCR. A constant length of time that is sufficient to transport packets containing PSI and a PCR may be used. This constant is shown as L. At a minimum the start of the stream must be L earlier than $T_{v1}$. This minimum start time is $T_{Bmin}$. $T_{Bideal}$ must be $T_{Bmin}$ or earlier and must be at least $N_{AU}$ video frame periods before $T_{DTS1}$, the decode time for $VAU_1$. The difference between $T_{DTS}$ and $T_{Bideal}$ must also be an integral number of frame periods. $N_{AUB}$ is the number of frame periods between $T_{DTS1}$ and $T_{Bideal}$ and is determined according to equation (1)

$$N_{AUB} = \max[N_{NAU}, \text{ceiling}(T_{DTS1} - T_{Bmin})/\text{frame\_period}] \quad (1)$$

The function max [x, y] returns the maximum of the numbers x and y. The function ceiling(a) returns the smallest integer that is greater than or equal to the number a. The variable frame—period is the duration of one video frame and is a function of the frame rate that is specified in the video elementary stream.

$T_{Bideal}$ is determined according to equation (2)

$$T_{Bideal} = T_{DTS1} - N_{AUB} * \text{frame\_period} \quad (2)$$

Figure 3B:
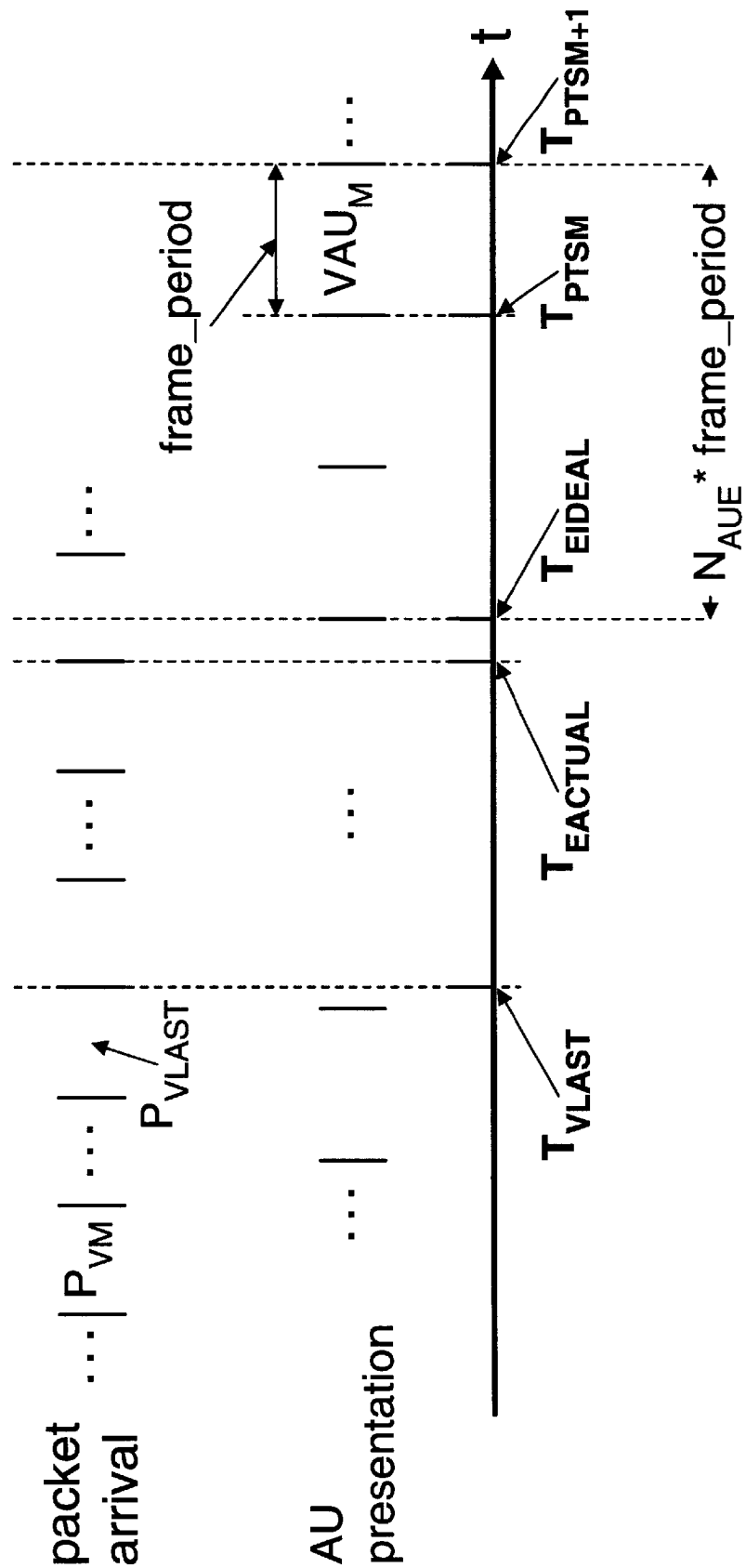
FIG. 3B is a timing diagram illustrating the determination of the length of the transport stream after the last access unit that is presented.

At a block 280, the value for $T_{Eideal}$ is determined. As shown in FIG. 3B, $T_{Eideal}$ is the ideal time for the end of the transport stream. $T_{Eideal}$ must be later than $T_{Vlast}$, the input arrival time of the last byte of $P_{Vlast}$, the packet containing the last byte of elementary stream. $VAU_m$ is the last picture displayed in the transport stream. $P_{Vm}$ is the packet containing the first byte of $VAU_m$. $T_{Eideal}$ must also be a maximum of $N_{AU}$ video frame periods before $T_{PTSm+1}$, the PTS for $VAU_m$ plus one frame period. The difference between $T_{PTSm+1}$ and $T_{Eideal}$ must also be an integral number of frame periods. $N_{AUE}$ is the number of frame periods between $T_{PTSm+1}$ and $T_{Eideal}$ and is determined according to equation (3)

$$N_{AUE} = \min[N_{AU}, \text{ceiling}((T_{PTSm+1} - T_{Vlast})/\text{frame\_period})] \quad (3)$$

The function min [x, y] returns the minimum of the numbers x and y.

$T_{Eideal}$ is determined according to equation (4)

$$T_{Eideal} = T_{PTSm+1} - N_{AUE} * \text{frame—period} \quad (4)$$

At a block 282, the actual start of the transport stream, $T_{Bactual}$, is determined. $T_{Bactual}$ is the input arrival time of the packet that starts the transport stream. The input arrival time of a packet is the input arrival time of the first byte of the packet. The packet with input arrival time of $T_{Bactual}$ is the packet whose input arrival time is closest to $T_{Bideal}$. This packet is the one that gives the minimum value for $D_B(j)$, the distance from $T_{Bideal}$ to the $j^{th}$ packet, where j is the index of any packet in the transport stream $D_B(j)$ is determined according to equation (5)

$$D_B(j) = |T_{Bideal} - T_{pkt}(j)| \quad (5)$$

The function |x| returns the absolute value of the number x. The function $T_{pkt(j)}$ returns the input arrival time of the $j^{th}$ packet. At block 282, $NP_B$ is also determined. $NP_B$ is the number of leader packets that must be added before $P_{V1}$ to start the stream at $T_{Bactual}$. $NP_B$ is determined according to equation (6)

$$NP_B = (T_{Bactual} - T_{V1})/\text{packet\_period} \quad (6)$$

The variable packet—period is the duration of one transport packet.

At a block 284, the actual end of the transport stream, $T_{Eactual}$, is determined. $T_{Eactual}$ is the input arrival time of the final packet in the transport stream plus one packet period. The final packet is determined by finding the packet whose input arrival time plus one packet period is closest to $T_{Bideal}$. This packet is the one that gives the minimum value for $D_E(k)$, the distance from $T_{Eideal}$ to the $k+1^{th}$ packet, where k is the index of any packet in the transport stream. DE(k) is determined according to equation (5)

$$DE(k) = |T_{Eideal} - T_{pkt}h(k) - \text{packet—period}| \quad (7)$$

At block 284, $NP_E$ is also determined. $NP_E$ is the number of trail packets that must be added after $P_{Vlast}$ to end the stream at $T_{Eactual}$. $NP_E$ is determined according to equation (8)

$$NP_E = (T_{Eactual} - T_{Vlast} - \text{packet\_period})/\text{packet\_period} \quad (8)$$

At a block 286, $NP_B$ null transport packets are inserted as a leader before $P_{V1}$. At a block 288, $NP_E$ null transport packets are added as a trailer after $P_{Vlast}$.

At a block 290, PCRs are inserted in the transport stream before $P_{V1}$ at intervals less than or equal to $D_{PCR}$. $D_{PCR}$ is a predetermined constant that defines the minimum time interval between successive occurrences of PCRs in the transport stream. The value of $_{PCR}$ must be less than or equal to 0.1 sec, which is the minimum interval between successive occurrences of PCRs as defined in ISO/IEC 13818-1. A PCR is inserted in the transport stream by replacing a null packet with a PCR PID packet that contains adaptation field only and no payload. The adaptation field contains a PCR that is correct for the position of the packet in the transport stream. The discontinuity—indicator field is set to a value of one in the first PCR PID packet that is inserted. The discontinuity—indicator field has a value of zero in all other inserted PCR PID packets. The length of the transport stream is unchanged after the insertion of PCRs.

At a block 292, PCRs are inserted in the transport stream after the last packet containing elementary stream data, $P_{Vlast}$, at intervals less than or equal to $D_{PCR}$. The length of the transport stream is unchanged after the insertion of PCRs.

At a block 294, the payload from the second byte of payload through the byte before the first byte of the Program Association Table (PAT) is removed from the first PID O packet after $P_{V1}$. This may be accomplished by replacing the payload with adaptation field stuffing bytes. Alternatively, the PAT may be moved to the second byte of payload, and packet stuffing bytes of 0xFF used to fill the remaining payload after the end of the PAT. In either case, the pointer—field, which is the first byte of payload in the PID O packet, is set to a value of zero.

At a block 296, the payload from the second byte of payload through the byte before the first byte of the Program Map Table (PMT) is removed from the first PMT PID packet after $P_{V1}$. This may be accomplished by replacing the payload with adaptation field stuffing bytes. Alternatively, the PMT may be moved to the second byte of payload, and packet stuffing bytes of 0xFF used to fill the remaining payload after the end of the PMT. In either case, the pointer—field, which is the first byte of payload in the PMT PID packet, is set to a value of zero.

At a block 298, packets containing PSI tables are inserted in the transport stream before $P_{V11}$. A PID O packet containing a Program Association Table (PAT) is substituted for a null packet that occurs in the stream before $P_{V1}$. This PAT is a duplicate of the next PAT to appear in the transport stream. The inserted PID O packet contains a discontinuity—indicator field with a value of one. A PMT PID packet containing a PMT with a section—length with a value of 13 is inserted in place of a null packet after the inserted PID O packet and before $P_{v1}$. The version—number of the PMT in this packet is one less than the version—number of the next PMT to appear in the transport stream. The PMT PID packet contains a discontinuity—indicator with a value of one. A second PMT PID packet containing a PMT is inserted in place of a null packet after the inserted PMT PID packet and before $P_{V1}$. The PMT in this packet is a duplicate of the next PMT to appear in the transport stream.

At a block 300, the discontinuity_indicator field is set to a value of one in the first packet in the transport stream with the video PID. If an adaptation field containing the discontinuity—indicator field cannot be contained in this first video packet, then a packet with the video PID containing adaptation field only and no payload is inserted in place of a null packet that occurs in the stream before the first video packet The discontinuity—indicator in this inserted video packet is set to a value of one. At block 300, the discontinuity—indicator field is set to a value of one in the first packet with the audio PID in the transport stream. If an adaptation field containing the discontinuity—indicator field cannot be contained in this first audio packet, then an audio packet containing adaptation field only and no payload is inserted in place of a null packet that occurs in the stream before the first audio packet. The discontinuity_indicator in this inserted audio packet is set to a value of one.

At a block 302, $PCR_{Bbias}$ and $PCR_{Ebias}$ are determined. $PCR_{Bbias}$ is the difference between $T_{Bideal}$ and $T_{Bactual}$ as given in equation (9)

$$PCR_{Bbias}=T_{Bideal}-T_{Bactual} \quad (9)$$

$PCR_{Ebias}$ is the difference between $T_{Eideal}$ and $T_{Eactual}$ as given in equation (10)

$$PCR_{Bbias}=T_{Eideal}-T_{Eactual} \quad (10)$$

At a block 304, each PCR in the transport stream is adjusted according to equation (11)

$$PCR_{new}=PCR_{org}+PCR_{Bbias}+i*(PCR_{Ebias-PCRBbias})/(N-1) \quad (11)$$

$PCR_{new}$ is the adjusted value of the PCR that is used to replace the original value. $PCR_{org}$ is the original value of the PCR. The variable i is the index of the packet containing the PCR with value $PCR_{org}$. The first packet in the transport stream has an index of 0, and the last packet has an index of N minus one. The constant N is the number of packets in the transport stream.

At a block 306, the continuity—counter field in each of the packets for each PID is corrected if necessary according to the definition specified in ISO/EEC 13818-1.

The routine ends at a block 308.

While a preferred embodiment of my method has been illustrated and described, it will be appreciated that various modifications are possible without departing from the spirit and scope of the method. For example, there may not be a secondary elementary stream in which case the method applies only to the primary elementary stream, or the primary elementary stream may be audio instead of video. In another embodiment of the method, there may be more than one secondary elementary stream. In this case, the primary elementary stream and all secondary elementary streams must reference the same time base, but are not required to be in the same program. Furthermore, all processing and insertion of packets containing PSI may be omitted.

The preferred embodiment describes a routine that is performed on an existing transport stream. However, the method may be applied to a transport stream as it is being created by a multiplexer.

In the embodiment described above, the access unit that is selected as the beginning access unit for the processed stream is the first access unit found in the transport stream that meets the stated criteria. Alternatively, any access unit that is found in the transport stream that meets the criteria may be used as the beginning access unit. Likewise in the preferred embodiment, the last access unit in the transport stream to satisfy the criteria described in the embodiment is selected as the ending access unit. In another embodiment, any access unit that meets the criteria for an ending access unit and that is later than the selected beginning access unit may be designated as the ending access unit.

It will also be appreciated that the routine that is illustrated and described is exemplary in nature and various changes can be made to the routine. The order that some of the steps in the routine are performed may be modified, and some steps may be omitted if they are not a requirement for the application. For example, the discontinuity—indicator field may not be set to one in the initial video, audio, PSI, or PCR PID packet.

Within the scope of the appended claims it will be appreciated that the invention can be practiced other than as specified herein.

I claim:

1. A method for setting a transmission duration and a system clock frequency of an MPEG-2 transport stream to match a presentation duration of a primary elementary stream conveyed therein, the method comprising the steps of:

(a) determining a beginning access unit in said primary elementary stream for a start transition;

(b) creating and inserting a PES header and a time stamp for said beginning access unit in the event the PES header and the time stamp are not included with the beginning access unit;

(c) determining an ending access unit in said primary elementary stream for an ending transition;

(d) determining a last presented access unit in the transport stream ending with said ending access unit;

(e) determining a latest presentation time as the presentation time stamp of said last presented access unit;

(f) determining an ideal beginning time for said transport stream being a predetermined number, $N_{AU}$, of access unit periods before the time stamp of said beginning access unit;

(g) determining an ideal ending time for said transport stream being $N_{AU+}1$ access unit periods before said latest presentation time;

(h) determining a number of leader packets to precede said beginning access unit so that said transport stream begins approximately at said ideal beginning time;

(i) determining a number of trailer packets to follow said ending access unit so that said transport stream ends approximately at said ideal ending time;

(j) determining a correction for at least one PCR so that an actual beginning time of the transport stream is equal to said ideal beginning time and an actual ending time of the transport stream is equal to said ideal ending time;

(k) modifying said transport stream with said number of leader packets before said beginning access unit;

(l) modifying said transport stream with said number of trailer packets after said ending access unit; and (m) adjusting at least one PCR in said transport stream with said correction;

whereby the transmission duration of said MPEG-2 transport stream is exactly equal to the presentation duration of said access units in said primary elementary stream.

2. The method of claim 1, wherein the primary elementary stream is a video elementary stream, further including the steps of:

(a) if there is an I picture in said video elementary stream,
  (i) determining the I picture location; and
  (ii) storing a beginning of said I picture location as a beginning video access unit (VAU);

(b) if there are not I pictures in said video elementary stream,
  (i) determining a P picture location; and
  (ii) storing a beginning of said P picture location as the beginning VAU;

(c) removing all video data prior to said beginning VAU;

(d) if a picture after said beginning VAU is a B picture, removing said B-picture in its entirety;

(e) repeating step (d) until the picture after said beginning VAU is not a B picture;

(f) if a value of a top—field—first—field of said beginning VAU is zero and a value of a repeat first—field—field of said beginning VAU is zero, setting the repeat first—field—field of said beginning VAU to one;

(g) if the value of the top—field—first—field of said beginning VAU is zero and the value of the repeat—first—field field of said beginning VAU is one, setting the repeat—first—field field of said beginning VAU to zero;

(h) setting the top—field—first field of said beginning VAU to one;

(i) adjusting the decode time stamp for said beginning VAU for each B picture removed and for any changes in said repeat—first—field field;

(j) if any B pictures are present in said video elementary stream, storing the location of the B picture preceding a last picture that is not a B picture as the ending VAU;

(k) if B pictures are not present in the video elementary stream, storing a location of a last complete access unit as the ending VAU;

(l) removing all video payload after said ending VAU;

(m) determining a last presented VAU in said video elementary stream;

(n) if in said last presented VAU the top—field—first field is equal to one and the repeat—first—field field is equal to one, setting the repeat—first—field field in said last presented VAU equal to zero;

(o) if in said last presented VAU the top—field—first field equals zero and the repeat—first—field field equals zero, setting said repeat—first—field field in said last presented VAU equal to one;

whereby a modified video elementary stream will begin and end with one or more complete frames and will not reference a non-existing anchor frame.

3. The method of claim 2, including the steps of:

(a) storing a first sequence header into a buffer;

(b) storing a first sequence extension into the buffer;

(c) if said video elementary stream does not have a sequence extension before said beginning VAU, inserting said sequence extension from said buffer into said transport stream before said beginning VAU; and (d) if said video elementary stream does not have a sequence header before said beginning VAU, copying the sequence header from said buffer into said transport stream before the sequence extension preceding said beginning VAU;

whereby having said video elementary stream begins with the sequence header and the sequence extension.

4. The method of claim 1, further including the steps of:

(a) finding a first complete PAT in said transport stream;

(b) copying into a buffer packets containing said first complete PAT;

(c) removing all payload in a PID zero packet in said transport stream prior to the beginning of said first complete PAT;

(d) substituting the PID zero packet into said transport stream prior to said beginning access unit in place of a corresponding null packet;

(e) finding a first complete PMT for said primary elementary stream;

(f) copying into the buffer packets containing said first complete PMT;

(g) removing all payload in a PMT PID packet in said transport stream prior to the beginning of said first complete PMT; and (h) substituting the PMT PID packet into said transport stream after a previously substituted PAT packets and prior to said beginning access unit in place of the null packet;

whereby a PSI in the beginning of said transport stream would define said primary elementary stream prior to a first packet of said primary elementary stream.

5. The method of claim 4, further including the steps of:

(a) setting a discontinuity—indicator in a first PID zero packet;

(b) copying into the buffer a packet containing said first complete PMT;

(c) modifying the first complete PMT to have a section—length field equal to 13 and a version—number equal to the version—number of said first complete PMT minus one;

(d) setting the discontinuity—indicator in the first complete PMT packet conveying the first complete PMT; and (e) substituting the first PMT PID packet containing the first complete PMT into said transport stream in place of the null packet after a last packet conveying the previously substituted PAT packets and before a previously inserted PMT PID packet;

whereby the discontinuity—indicator would notify the decoder that the PAT and the PMTs have potentially changed at the transport stream transition.

6. The method of claim 1, further including the step of:

(a) if said ideal beginning time is not before said beginning access unit and any preceding PSI packets, reducing said ideal beginning time by an integral number of access unit periods to make said ideal beginning time of said transport stream earlier than said beginning access unit and any preceding PSI packets;

whereby the time between a beginning of the transport stream and a decode of the first access unit is an integral number of access unit periods greater than said predetermined number, $N_{AU}$.

7. The method of claim 1, further including the step of:
(a) if said ideal ending time is not after the end of said ending access unit, increasing said ideal ending time by an integral number of access unit periods to make said ideal ending time of said transport stream later than said ending access unit;

whereby the time between an ending of the transport stream and an ending of a presentation of the last presented access unit is an integral number of access unit periods less than said predetermined number, $N_{AU}$.

8. The method of claim 1, wherein there is a secondary elementary stream in said transport stream referencing the same time base as said primary elementary stream, further including the steps of:
(a) determining a beginning access unit in said secondary elementary stream such that a decode time of said beginning access unit is equal to or later than the decode time of said beginning access unit of said primary elementary stream;
(b) removing all data from said secondary elementary stream prior to said beginning access unit in said secondary elementary stream;
(c) determining an ending access unit in said secondary elementary stream such that the presentation time of said ending access unit is equal to or earlier than said latest presentation time of said primary elementary stream;
(d) removing all data from said secondary elementary stream after the end of said ending access unit;

whereby the access units of the secondary elementary stream commence no earlier than and end no later than the access units of the primary elementary stream.

9. The method of claim 8, further including the steps of,
(a) finding a first packet conveying the secondary elementary stream;
(b) if there is an adaptation—field in said first packet, setting a discontinuity—indicator field to one;
(c) if there is no adaptation—field in said first packet, inserting the adaptation—field containing the discontinuity—indicator field set to one;

whereby setting the discontinuity—indicator indicates a transition in the secondary elementary stream at the beginning of the transport stream.

10. The method of claim 8, further including the step of repeating steps (a)–(d) for each secondary elementary stream in said transport stream referencing a same time base as said primary elementary stream.

11. The method of claim 10, further including the following repeating steps for each secondary elementary stream in said transport stream referencing the same time base as said primary elementary stream:
(a) finding the first packet conveying the secondary elementary stream;
(b) if there is the adaptation—field in said packet, setting the discontinuity—indicator field to one;
(c) if there is no adaptation—field in said packet, inserting the adaptation—field containing the discontinuity—indicator field set to one;

whereby setting the discontinuity—indicator indicates a transition in the secondary elementary stream at the beginning of the transport stream.

12. The method of claim 1, further including the steps of:
(a) finding a first packet with a primary elementary stream PID;
(b) if there is an adaptation—field in said first packet, setting a discontinuity—indicator field to one;
(c) if there is no adaptation—field in said packet, inserting the adaptation—field containing the discontinuity—indicator field set to one;

whereby setting the discontinuity—indicator indicates a transition in the primary elementary stream at the beginning of the transport stream.

13. The method of claim 1, including the steps of:
(a) substituting packets containing PCRs in place of null packets in the leader packets to maintain a minimal PCR spacing of a predetermined time;
(b) substituting packets containing PCRs in place of null packets in the trailer packets to maintain the minimal PCR spacing of the predetermined time;

whereby said transport stream will contain PCRs at an interval of the predetermined time.

14. A method for adjusting a beginning access unit and an ending access unit of a video elementary stream to remove an odd field and eliminate references to a non-existent anchor frame, the method comprising the steps of:
(a) if there are I pictures in said video elementary stream,
   (i) determining an I picture location;
   (ii) storing a beginning of said I picture location as a beginning video access unit (VAU);
(b) if there are not I pictures in said video elementary stream,
   (i) determining a P picture location (ii) storing a beginning of said P picture location as the beginning VAU;
(c) removing all video data prior to said beginning VAU;
(d) if the picture after said beginning VAU is a B picture, removing said B picture in its entirety;
(e) repeating step (d) until the picture after said beginning VAU is not a B picture;
(f) if a value of a top—field—first field of said beginning VAU is zero and the value of a repeat—first—field field of said beginning VAU is zero, setting the repeat—first—field field of said beginning VAU to one;
(g) if the value of the top—field—first field of said beginning VAU is zero and the value of the repeat—first—field field of said beginning VAU is one, setting the repeat—first—field field of said beginning VAU to zero;
(h) setting the top—field—first field of said beginning VAU to one;
(i) adjusting a decode time stamp for said beginning VAU for each B picture removed and for any changes in said repeat—first—field field;
(j) if B pictures are present in said video elementary stream, storing the location of the B picture preceding a last picture that is not a B picture as an ending VAU;
(k) if B pictures are not present in the video elementary stream, storing the location of a last complete access unit as the ending VAU;
(l) removing all video payload after said ending VAU;
(m) determining a last presented VAU in said video elementary stream;
(n) if in said last presented VAU the top—field—first field is equal to one and the repeat—first—field field is equal to one, setting the repeat—first—field field in said last presented VAU equal to zero;
(o) if in said last presented VAU the top—field—first field equals zero and the repeat—first—field field equals zero, setting said repeat—first—field field in said last presented VAU equal to one;

whereby a modified video elementary stream will begin and end with one or more complete frames and will not reference a non-existing anchor frame.

15. The method of claim 14, including the steps of:
(a) storing a first sequence header into a buffer;
(b) storing a first sequence extension into the buffer;
(c) if said video elementary stream does not have the first sequence extension before said beginning VAU, inserting said sequence extension from said buffer into said transport stream before said beginning VAU;
(d) if said video elementary stream does not have the first sequence header before said beginning VAU, copying the sequence header from said buffer into said transport stream before the sequence extension preceding said beginning VAU;
whereby said video elementary stream begins with the first sequence header and the first sequence extension.

16. A method for setting a transmission duration of an MPEG-2 transport stream to match a presentation duration of a primary elementary stream conveyed therein, the method comprising the steps of:
(a) determining a beginning access unit and its associated decode time stamp in said primary elementary stream for a start transition;
(b) determining an ending access unit and its associated decode time stamp in said primary elementary stream for an ending transition;
(c) determining an ideal beginning time for said transport stream being a predetermined number, $N_{AU}$, of access unit periods before the decode time stamp of said beginning access unit;
(d) determining an ideal ending time for said transport stream being $N_{AU}+1$ access unit periods before the decode time stamp of said ending access unit;
(e) determining a number of leader packets to precede said beginning access unit so that said transport stream begins within a packet of said ideal beginning time;
(f) determining a number of trailer packets to follow said ending access unit so that said transport stream ends within a packet of said ideal ending time;
(g) modifying said transport stream with said number of leader and trailer packets;
whereby the transmission duration of said MPEG-2 transport stream is approximately equal to the presentation duration of said access units in said primary elementary stream.

* * * * *